(12) United States Patent
Rorvig et al.

(10) Patent No.: US 6,789,084 B2
(45) Date of Patent: Sep. 7, 2004

(54) METHOD FOR GENERATING NUMERICAL VALUES INDICATIVE OF FREQUENCIES OF SELECTED FEATURES IN OBJECTS, AND A COMPUTER SYSTEM IMPLEMENTING THE METHOD

(75) Inventors: Mark E. Rorvig, Denton, TX (US); Ki Tai Jeong, Carrollton, TX (US)

(73) Assignee: University of North Texas, Denton, TX (US)

(*) Notice: Subject to any disclaimer, the term of this patent is extended or adjusted under 35 U.S.C. 154(b) by 162 days.

(21) Appl. No.: 09/990,052

(22) Filed: Nov. 21, 2001

(65) Prior Publication Data

US 2003/0097366 A1 May 22, 2003

(51) Int. Cl.[7] .............................................. G06F 17/00
(52) U.S. Cl. ....................................... 707/101; 707/102
(58) Field of Search ................................ 707/100, 101, 707/104.1, 1–3, 102, 103 R, 103 Y, 103, 103 Z

(56) References Cited

U.S. PATENT DOCUMENTS

| | | | | |
|---|---|---|---|---|
| 4,495,522 A | * | 1/1985 | Matsunawa et al. | 358/465 |
| 5,675,819 A | * | 10/1997 | Schuetze | 704/10 |
| 6,615,163 B1 | * | 9/2003 | Rasoulian et al. | 702/196 |
| 2002/0059161 A1 | * | 5/2002 | Li | 707/1 |
| 2002/0087508 A1 | * | 7/2002 | Hull et al. | 707/1 |

OTHER PUBLICATIONS

Joel L. Fagan "Automatic Phrase Indexing for Document Retrieval", ACM 1987, pp. 91–101.*

Deerwester, S., Dumais, S.T., Landauer, T. K., Furnas, G. W. and Harshman, R. A. (1990), "Indexing by Latent Semantic Analysis," Journal of the Society for Information Science, 41(6), 391–407.

* cited by examiner

*Primary Examiner*—Uyen Le
(74) *Attorney, Agent, or Firm*—Williams, Morgan & Amerson

(57) ABSTRACT

A method is described that includes arranging columns of a matrix in sum total order, wherein the matrix has one or more rows, and multiple intersecting columns. Rows represent objects, and columns represent selected features. Values reside at row-column intersections and represents the frequency of the selected feature in the object The matrix is converted to a binary matrix. The columns are divided into multiple segments of equal length. Columns encompassed by each segment are replaced by a single column. Values at intersections of the rows and the single columns are set equal to numerical values indicative of ratios of a total number of the binary values of '1' in a portion of the corresponding row encompassed by a segment to a total number of the binary values of '1' in the corresponding row.

21 Claims, 12 Drawing Sheets

|   | 1 | 2 | 6 | 4 | 5 | 3 |
|---|---|---|---|---|---|---|
| 1 | 3 | 2 | 0 | 0 | 0 | 1 |
| 2 | 0 | 1 | 0 | 3 | 1 | 2 |
| 3 | 0 | 0 | 3 | 1 | 2 | 0 |
| 4 | 3 | 2 | 2 | 0 | 1 | 1 |
| 5 | 0 | 1 | 1 | 1 | 0 | 2 |
| 6 | 2 | 1 | 1 | 1 | 2 | 0 |

OBJECT (rows) / FEATURE (columns) — 600

FIG. 6A

|   | 1 | 6 | 2 | 3 | 4 | 5 |
|---|---|---|---|---|---|---|
| 1 | 3 | 0 | 2 | 1 | 0 | 0 |
| 2 | 0 | 0 | 1 | 2 | 3 | 1 |
| 3 | 0 | 3 | 0 | 0 | 1 | 2 |
| 4 | 3 | 2 | 2 | 1 | 0 | 1 |
| 5 | 0 | 1 | 1 | 2 | 1 | 0 |
| 6 | 2 | 1 | 1 | 0 | 1 | 2 |

OBJECT (rows) / FEATURE (columns) — 602

FIG. 6B

|   | 1 | 2 | 6 | 4 | 5 | 3 |
|---|---|---|---|---|---|---|
| 1 | 1 | 1 | 0 | 0 | 0 | 1 |
| 2 | 0 | 1 | 0 | 1 | 1 | 1 |
| 3 | 0 | 0 | 1 | 1 | 1 | 0 |
| 4 | 1 | 1 | 1 | 0 | 1 | 1 |
| 5 | 0 | 1 | 1 | 1 | 0 | 1 |
| 6 | 1 | 1 | 1 | 1 | 1 | 0 |

OBJECT (rows), FEATURE (columns), 700

FIG. 7

|   | 1 | 2 |
|---|---|---|
| 1 | 2/3 | 1/3 |
| 2 | 1/4 | 3/4 |
| 3 | 1/3 | 2/3 |
| 4 | 3/5 | 2/5 |
| 5 | 2/4 | 2/4 |
| 6 | 3/5 | 2/5 |

OBJECT (rows) — SEGMENT (columns 1, 2) — 900

FIG. 9A

|   | 1 | 2 |
|---|---|---|
| 1 | 2/3 | 1/3 |
| 2 | 2/4 | 2/4 |
| 3 | 2/3 | 1/3 |
| 4 | 3/5 | 2/5 |
| 5 | 3/4 | 1/4 |
| 6 | 4/5 | 1/5 |

OBJECT (rows) — SEGMENT (columns 1, 2) — 902

METHOD FOR GENERATING NUMERICAL VALUES INDICATIVE OF FREQUENCIES OF SELECTED FEATURES IN OBJECTS, AND A COMPUTER SYSTEM IMPLEMENTING THE METHOD

BACKGROUND OF THE INVENTION

1. Field of the Invention

This invention relates generally to information retrieval systems, and, more particularly, to information retrieval systems that direct users to objects containing information (e.g., images, text, and/or sounds).

2. Description of the Related Art

Information retrieval (IR) may be generally described as the study of systems for indexing, storing, searching, and retrieving data relevant to a human user's need for information. Indexing is the process of converting data within a collection of objects (e.g., documents) into a form suitable for easy search and retrieval. The goal of information retrieval (IR) systems is to direct the user to those objects in the collection that will best satisfy the user's need for information.

Almost all information retrieval (IR) systems today accept either Boolean text search queries, or text pattern search queries. Boolean text search queries typically include Boolean combinations of words (e.g., "information AND retrieval," "vision OR sight," "python AND (NOT monty)"). Text pattern search queries typically include word strings or phrases (e.g., "great barrier reef," as opposed to the Boolean expression "great AND barrier AND reef").

A problem arises in that information retrieval (IR) systems typically rely upon measurements of similarity between objects in a collection during indexing, and between queries and stored data during data retrieval. Words and phrases, used by almost all information retrieval (IR) systems today, may be thought of as being "highly granular." The resulting "fine granularity" leads to mistakes in the recognition of degrees of similarity among objects during indexing, and between queries and objects during data retrieval. These errors are foreign to human perception that easily shifts the logical frame of reference to compensate for variation of granularity in the similarity recognition task among objects.

For example, if a human subject were to visually scan two different areas of, for example, a beach, the subject would have little difficulty in recognizing both areas as belonging to the same general class of "Beach." However, if a machine (e.g., a computer) were to consider only grains of sand from the two different areas of the beach, the machine might conclude that, due to differences in, for example, the size, texture, and/or coarseness of the grains of sand, the two areas do not in fact belong to the same general class of Beach.

Computers employed in information retrieval (IR) systems today make similar mistakes when attempting to determine degrees of similarity among objects during indexing, and between queries and objects during data retrieval. As a result, information retrieval (IR) systems are not always highly effective when retrieving data deemed relevant to a human user's need for information.

Known efforts to reduce the granularity problem inherent when using words and phrases for similarity measurement include statistical techniques such as latent semantic indexing (LSI) and singular value decomposition (SVD). In general, such techniques result in a smaller pool of words or phrases upon which to measure similarity among objects during indexing, and between queries and objects during data retrieval.

The Internet is a global network connecting millions of computers worldwide. In 1999, the Internet had over 200 million users in over 100 different countries. The World Wide Web (abbreviated WWW, and often referred to simply as "the Web") is a portion of the Internet servers supporting documents formatted according to the hypertext markup language (HTML). The hypertext markup language (HTML) supports links to graphics, audio, and video files, as well as links to other HTML documents (i.e. "hyperlinks"). Computer programs called "Web browsers" are commonly used to access HTML documents on the World Wide Web.

For example, assume an HTML document has a link to graphics, audio, and/or video files, as well as a links to other HTML documents. When a computer user accesses the HTML document, the graphics, audio, and/or video files may be displayed on the user's computer. The user may transition from the HTML document to another HTML document simply by clicking on the link to the other HTML document.

The number of HTML documents accessible today via the Web may exceed one billion. "Search engines" are available to aid users in accessing specific HTML documents in this large number of HTML documents. A search engine is a computer program that accepts a user query including words called "keywords," searches indexed HTML documents for the keywords, and returns a list of the indexed HTML documents including the keywords. The list typically includes hyperlinks to the corresponding HTML documents.

Despite careful design, search engines often return lists containing a large number of "junk results" along with a small number of "meaningful results" a user is interested in. Being more plentiful than the meaningful results, the junk results often obscure the meaningful results. As most users are only willing to look at the first few tens of results, the user may never discover highly relevant HTML documents in a list containing hundreds of results.

As the number of HTML documents available on the Web continues to grow, new information retrieval techniques are needed that will allow search engines to return greater numbers of "meaningful results" and/or smaller numbers of "junk results."

The present invention is directed to methods that may solve, or at least reduce, some or all of the aforementioned problems, and systems incorporating the method.

SUMMARY OF THE INVENTION

A method is described that may be used to generate numerical values indicative of frequencies of selected features in one or more objects. The method includes arranging columns of a matrix in sum total order, wherein the matrix has one or more rows, and multiple intersecting columns. Each of the rows of the matrix represents a different object, and each of the columns represents a different one of multiple selected features. Values reside at row-column intersections. A given value residing at an intersection of a given row and a given column corresponds to the given row and the given column, and represents the frequency of the selected feature represented by the given column in the object represented by the given row.

The matrix is converted to a binary matrix (e.g., comprising binary values '0' and '1'). The columns of the matrix are divided into multiple segments of equal length. The matrix columns encompassed by each segment are replaced by a single column. Values at intersections of the rows and the single columns are set equal to numerical values indicative of ratios of a total number of one of the binary values (e.g., a total number of '1's) in a portion of the corresponding row encompassed by a segment to a total number of the one of the binary values (e.g. a total number of '1's) in the corresponding row.

A computer system embodying the method is also described, as is a carrier medium including program instructions for carrying out the method. The carrier medium may be, for example, a computer-readable storage medium such as a floppy disk or a compact disk read only memory (CD-ROM) disk.

BRIEF DESCRIPTION OF THE DRAWINGS

The invention may be understood by reference to the following description taken in conjunction with the accompanying drawings, in which like reference numerals identify similar elements, and in which:

FIGS. 6A–6B depict 2 possible outcomes of performing a "column arranging" operation of the method of FIGS. 2A–2B on the exemplary object-feature matrix of FIG. 4;

FIG. 7 depicts an outcome of a "convert to binary matrix" operation of the method of FIGS. 2A–2B, wherein the matrix of FIG. 6A is converted to a binary matrix;

FIG. 9A depicts a matrix resulting from performing a "represent each segment by a single column" operation of the method of FIGS. 2A–2B on the matrix of FIG. 8A;

FIG. 9B depicts a matrix resulting from performing the "represent each segment by a single column" operation of the method of FIGS. 2A–2B on the matrix of FIG. 8B.

Figure 1:
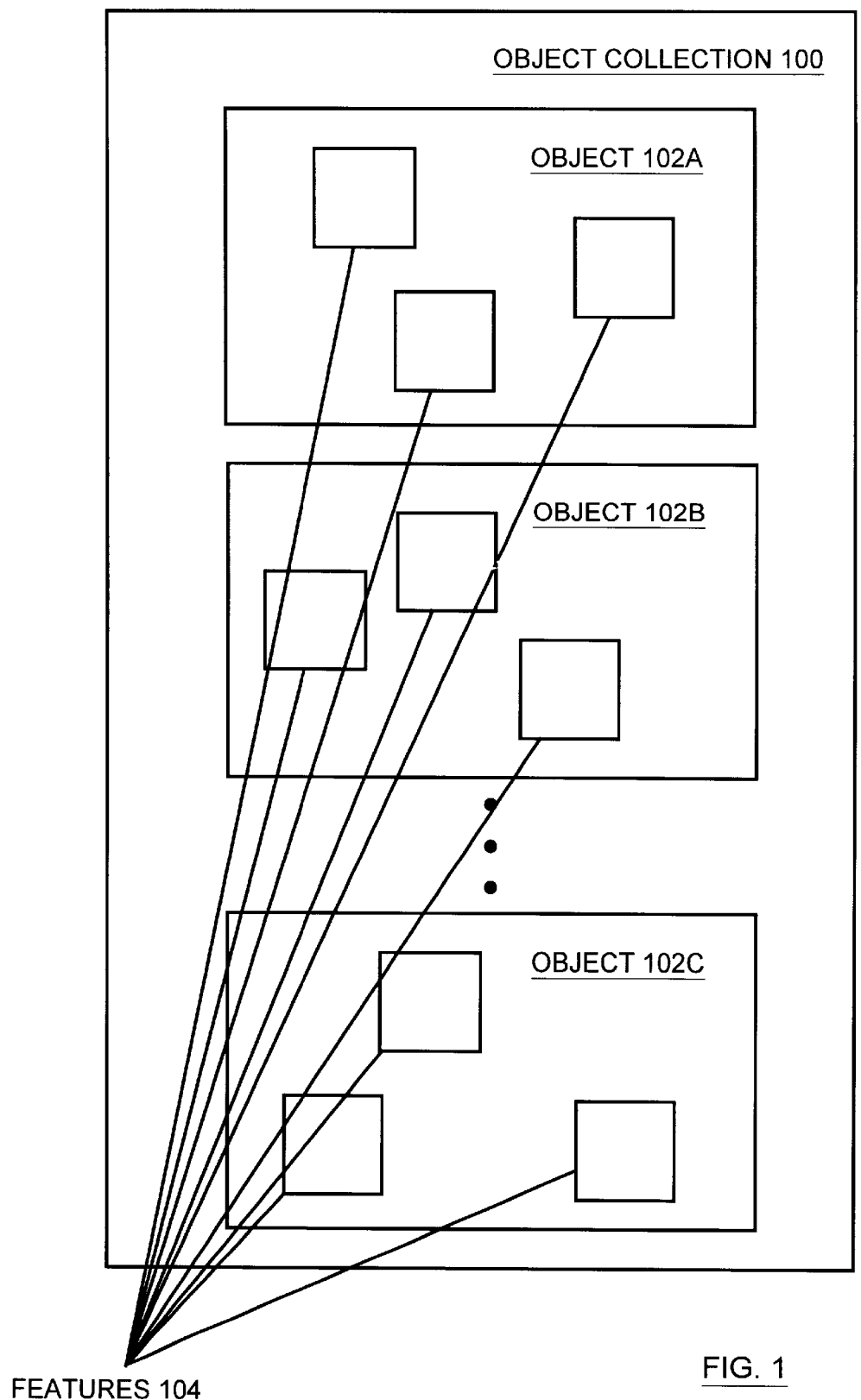
FIG. 1 is a diagram of an object collection including multiple objects, wherein each of the objects includes features (i.e., detectable patterns)

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will, of course, be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIG. 1 is a diagram of an object collection 100 including multiple objects 102A–102C. Each of the objects 102 includes organized data (i.e., information). Such organized data may be in the form of, for example, images, text, sounds, etc. As indicated in FIG. 1, each of the objects 102 also includes multiple features 104. As used herein, the term "feature" refers to a detectable pattern. For example, in an object 102 including an image, detectable patterns in the image may include, for example, variations in color and/or intensity. Such variations may represent, for example, shapes, corners, edges, etc. In an object 102 including text, detectable patterns in the text may include, for example, strings of symbols or characters (i.e., "text tokens"). Such strings of symbols or characters may form words, or word strings (i.e., phrases). In an object 102 including a sound, detectable patterns in the sound may include, for example, variations in frequency and/or amplitude. In general, the object collection 100 may include one or more objects 102.

Figure 2A:
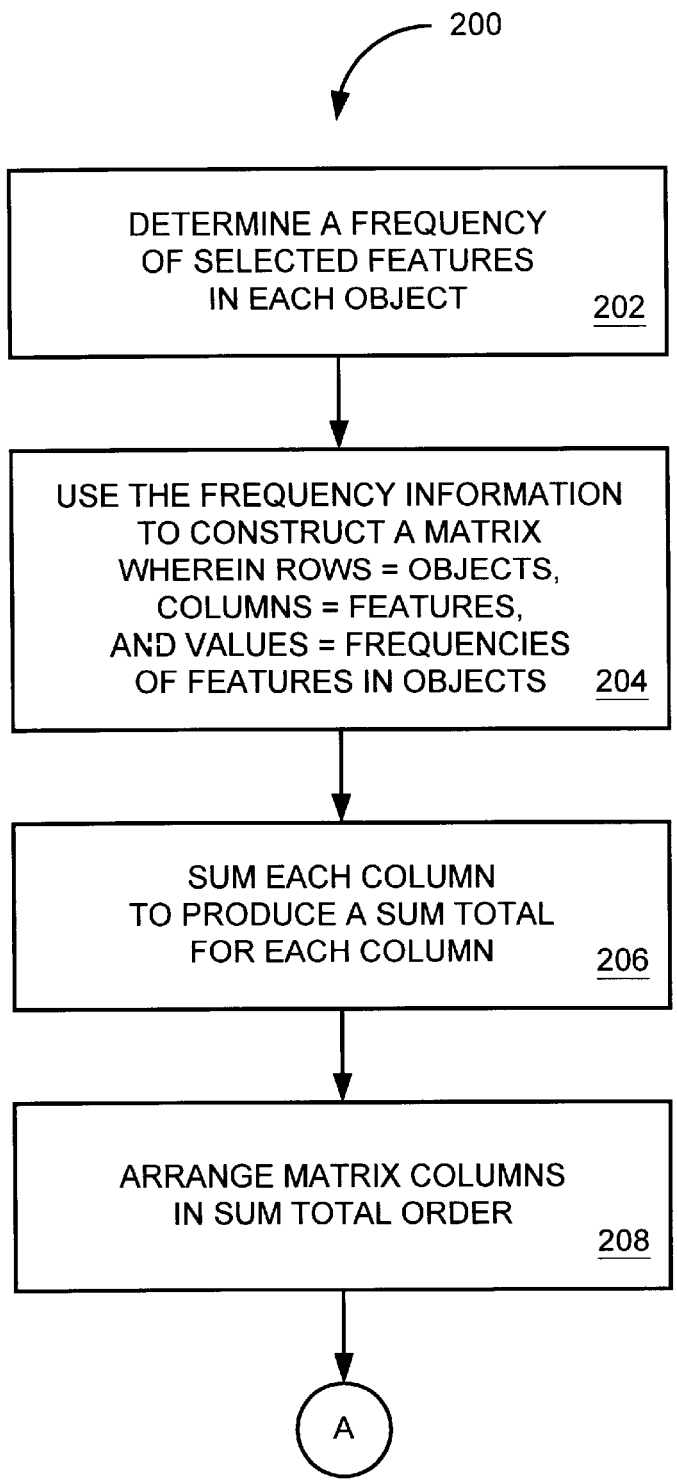
FIGS. 2A and 2B in combination form a flow chart of one embodiment of a method for generating numerical values for the objects of FIG. 1, wherein the numerical values are indicative of frequencies of selected features in the objects.
Figure 2B:
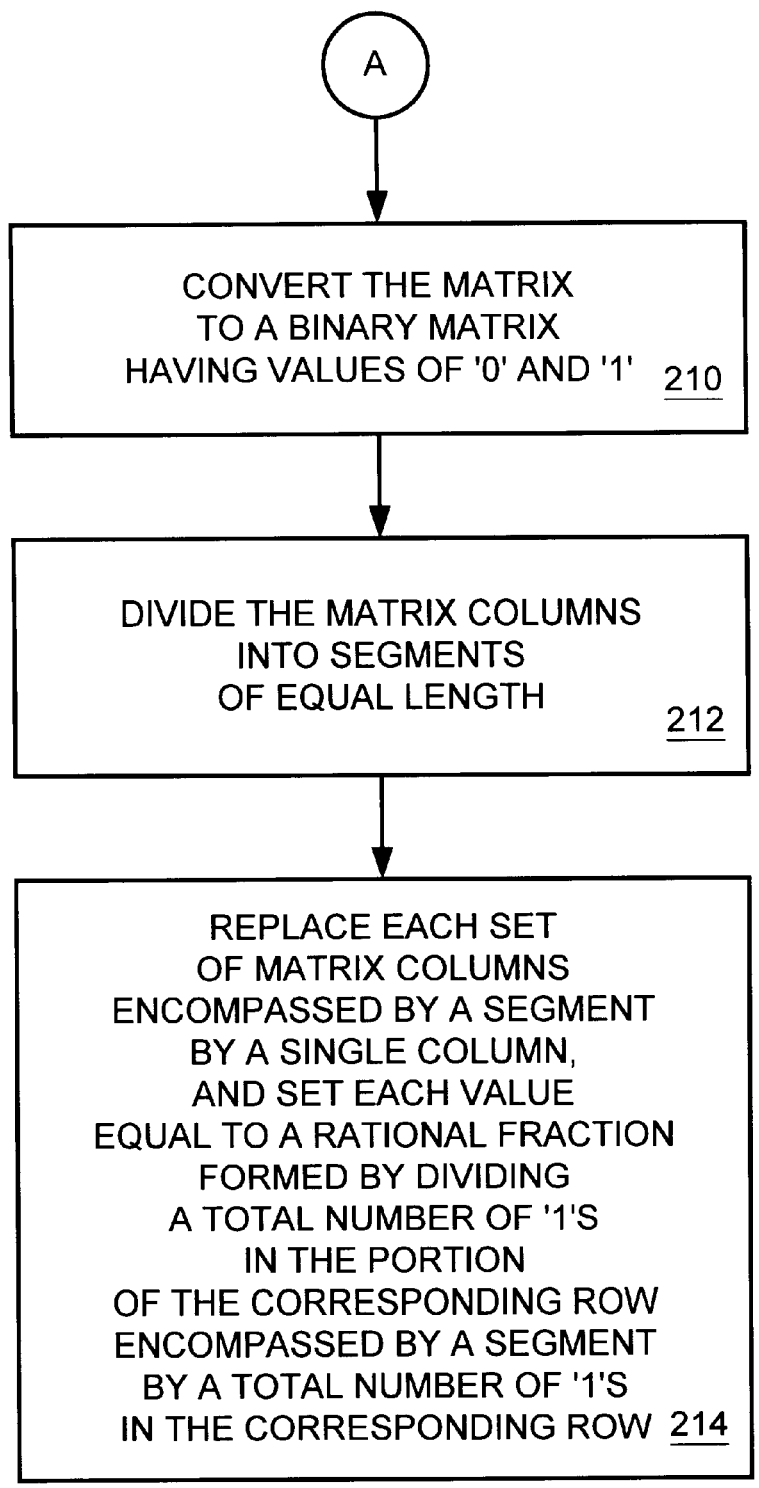

FIGS. 2A and 2B in combination form a flow chart of one embodiment of a method 200 for generating numerical values for the objects 102 of FIG. 1, wherein the numerical values are indicative of frequencies of selected features in the objects. FIGS. 3–9A and 9B will be used below to describe the operations of the method. The method 200 may be advantageously applied in measuring similarities between objects (e.g., during object indexing, and/or between queries and stored object data during object retrieval).

A first operation 202 of the method 200 includes determining a frequency of selected features in each object in an object collection (e.g., each object 102 of the object collection 100 of FIG. 1). Selection of the features may involve analyzing the objects. For example, the objects may be analyzed (e.g., scanned or parsed) to determine a set of features found therein. Referring back to FIG. 1, the objects 102A–102C may be analyzed to determine all of the features 104 therein. Features common to all the objects and judged to have little or no value in measuring similarities among the objects may be eliminated from the set of features. For example, referring back to FIG. 1, the selected features may be a subset of the features 104. Alternately, the set of features may be selected without analyzing the objects.

For example, the objects 102A–102C of FIG. 1 may include text, and the objects 102A–102C may be analyzed (e.g., scanned or parsed) to determine a set of text tokens found therein. If the text is English text, the text tokens would expectedly include articles such as "a" and "the," and prepositions such as "at," "by,", "in," "to," "from," and "with." Such text tokens may be judged to have little or no value in measuring similarities among the objects 102A–102C, and may be eliminated from the set of text tokens.

Referring back to FIG. 2, the next operation 204 of the method 200 includes using the frequency information to construct a two-dimensional matrix having intersecting rows and columns. Each of the rows represents a different one of the objects (e.g., objects 102A–102C of FIG. 1), and each of the columns represents a different one of the selected features (e.g., selected features 104 of FIG. 1). Values at row-column intersections represent frequencies of corresponding features in the corresponding objects. For example, a value at the intersection of a given row and a given column represents the frequency of the feature represented by the column in the object represented by the row.

Figure 3:
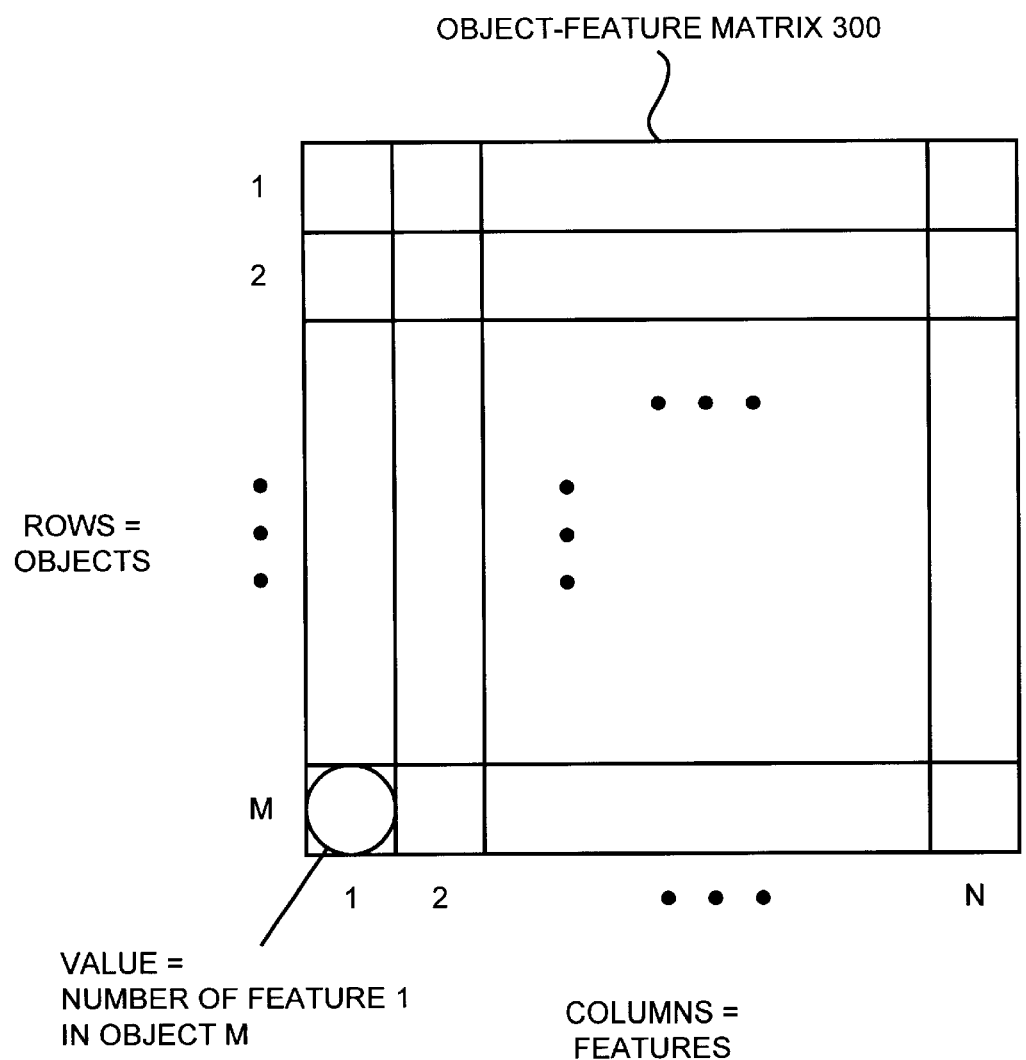
FIG. 3 depicts a representative embodiment of an m×n "object-feature" matrix constructed during an operation of the method of FIGS. 2A–2B, wherein each of the m rows of the matrix represents a different one of m objects of an object collection, and wherein each of the n columns of the matrix represents a different one of n selected features of the objects, and wherein values at row-column intersections represent frequencies of corresponding features in corresponding objects.

Turning to FIG. 3, a representative embodiment of an m×n "object-feature" matrix 300 constructed during the second operation 204 is shown. The m×n object-feature matrix 300 of FIG. 3 is constructed using frequency information of n selected features in m objects of an object collection. Each of the m rows represents a different one of the m objects, and each of the n columns represents a different one of the n selected features. The value at the intersection of row m and column 1 represents the frequency of selected feature 1 in object m.

Figure 4:
FIG. 4 depicts an exemplary embodiment of the object-feature matrix of FIG. 3, wherein the object collection includes 6 different objects (m=6), and wherein a set of selected features includes 6 different features (n=6)

Turning to FIG. 4, a matrix 400 is shown, wherein the matrix 400 is an exemplary embodiment of the object-feature matrix 300 of FIG. 3, and wherein the object collection (e.g., the object collection 100 of FIG. 1) includes 6 different objects (m=6), and wherein the set of selected features includes 6 different features (n=6). Values at row-column intersections represent frequencies of corresponding features in corresponding objects.

Figure 5:
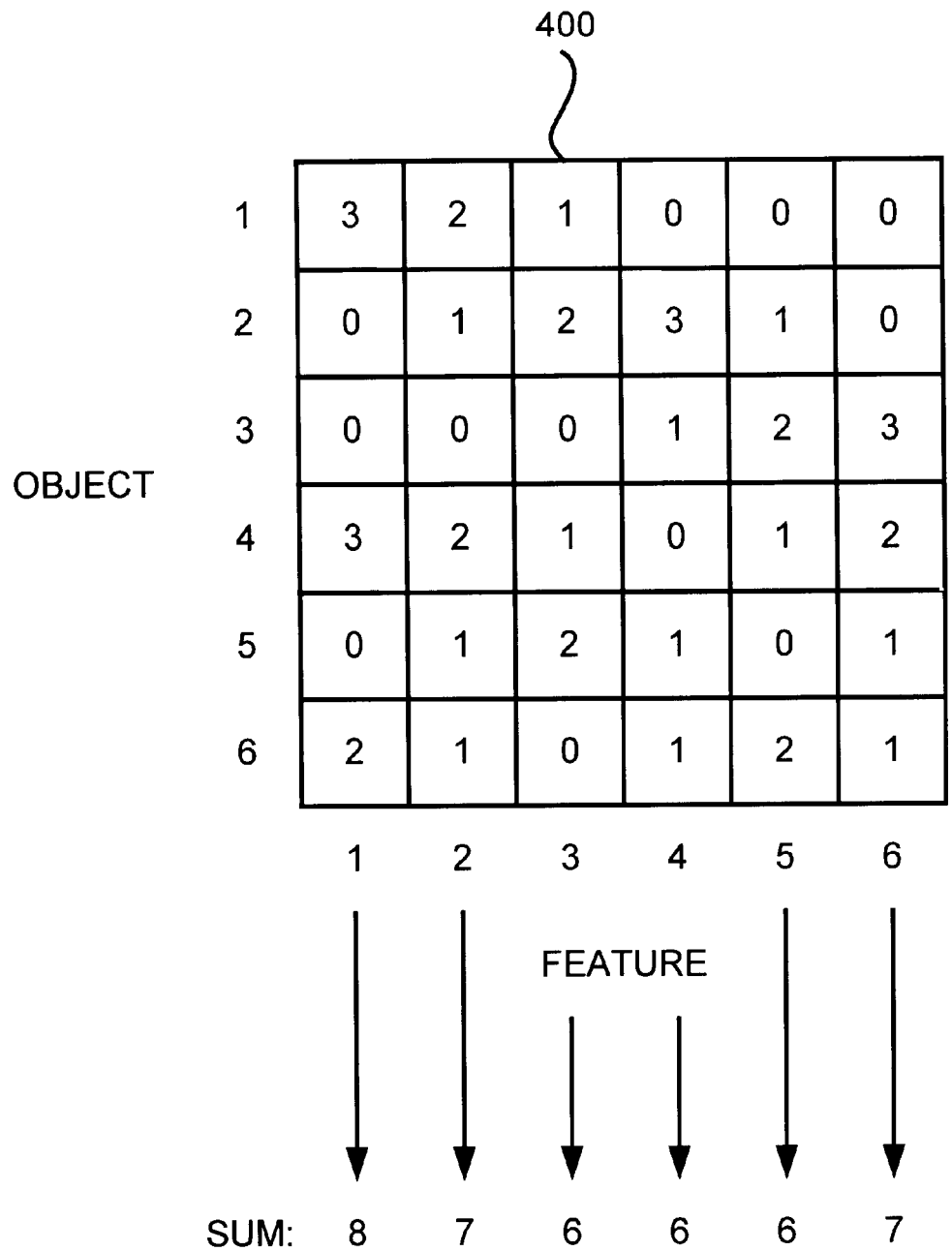
FIG. 5 depicts results of performing a "column summing" operation of the method of FIGS. 2A–2B on the exemplary object-feature matrix of FIG. 4.

Turning back to FIG. 2, the next operation 206 of the method 200 includes summing each of the columns of the matrix to produce a sum total for each of the columns. Turning to FIG. 5, results of the summing operation performed on the exemplary object-feature matrix 400 of FIG. 4 are depicted.

Turning back to FIG. 2, the next operation 208 of the method 200 includes arranging the columns of the matrix in sum total order. FIGS. 6A–6B depict 2 possible outcomes of the arranging operation performed on the exemplary object-feature matrix 400 of FIG. 4. Turning to FIG. 6A, columns 3 and 6 of the exemplary object-feature matrix 400 of FIG. 4 have been swapped, forming a matrix 600. As a result, the "1 2 3 4 5 6" ordering of the columns of matrix 400 of FIG. 4 is changed to "1 2 6 4 5 3" in the matrix 600. Since column 1 of matrix 600 has the greatest sum total, columns 3, 4, and 5 have the smallest sum totals, and columns 2 and 6 have sum totals between those of column 1 and columns 3, 4, and 5, the columns of matrix 600 are in decreasing sum total order.

Turning to FIG. 6B, columns 2, 3, 4, and 5 of the matrix 400 of FIG. 4 have all been moved one column position to the right, and column 6 has been moved to the second column position, forming a matrix 602. As a result, the "1 2 3 4 5 6" column ordering of the matrix 400 of FIG. 4 has been changed to "1 6 2 3 4 5." Since column 1 of matrix 602 has the greatest sum total, columns 3, 4, and 5 have the smallest sum totals, and columns 2 and 6 have sum totals between those of column 1 and columns 3, 4, and 5, the columns of matrix 602 are in decreasing sum total order.

It is noted that the columns of the matrix 400 of FIG. 4 may also be arranged in ascending sum total order during the fourth operation 208 of the method 200. Other equally valid outcomes of the column arranging operation include the column ordering sequences "1 2 6 3 4 5," "1 2 6 3 5 4," "1 2 6 4 3 5," "1 2 6 5 3 4," "1 2 6 5 4 3," "1 6 2 3 5 4," "1 6 2 4 3 5," "1 6 2 4 5 3," "1 6 2 5 3 4," "1 6 2 5 4 3," "3 4 5 2 6 1," "3 4 5 6 2 1," "3 5 4 2 6 1," "3 5 4 6 2 1," "4 3 5 2 6 1," "4 3 5 6 2 1," "4 5 3 2 6 1," "4 5 3 6 2 1," "5 4 3 2 6 1," "5 4 3 6 2 1," "5 3 4 2 6 1," and "5 3 4 6 2 1."

Turning back to FIG. 2, the next operation 210 of the method 200 includes converting the matrix to a binary matrix such that if a value representing the frequency of a given one of the features in a given one of the objects is greater than zero, the value is replaced by a '1', and if the value is equal to zero, the value is replaced by a '0'. Turning to FIG. 7, an outcome of converting the matrix 600 of FIG. 6A to a binary matrix is depicted. In view of the fact that the preceding column arranging operation may result in one of several valid outcomes, other valid outcomes of the converting operation also exist.

Figure 8A:
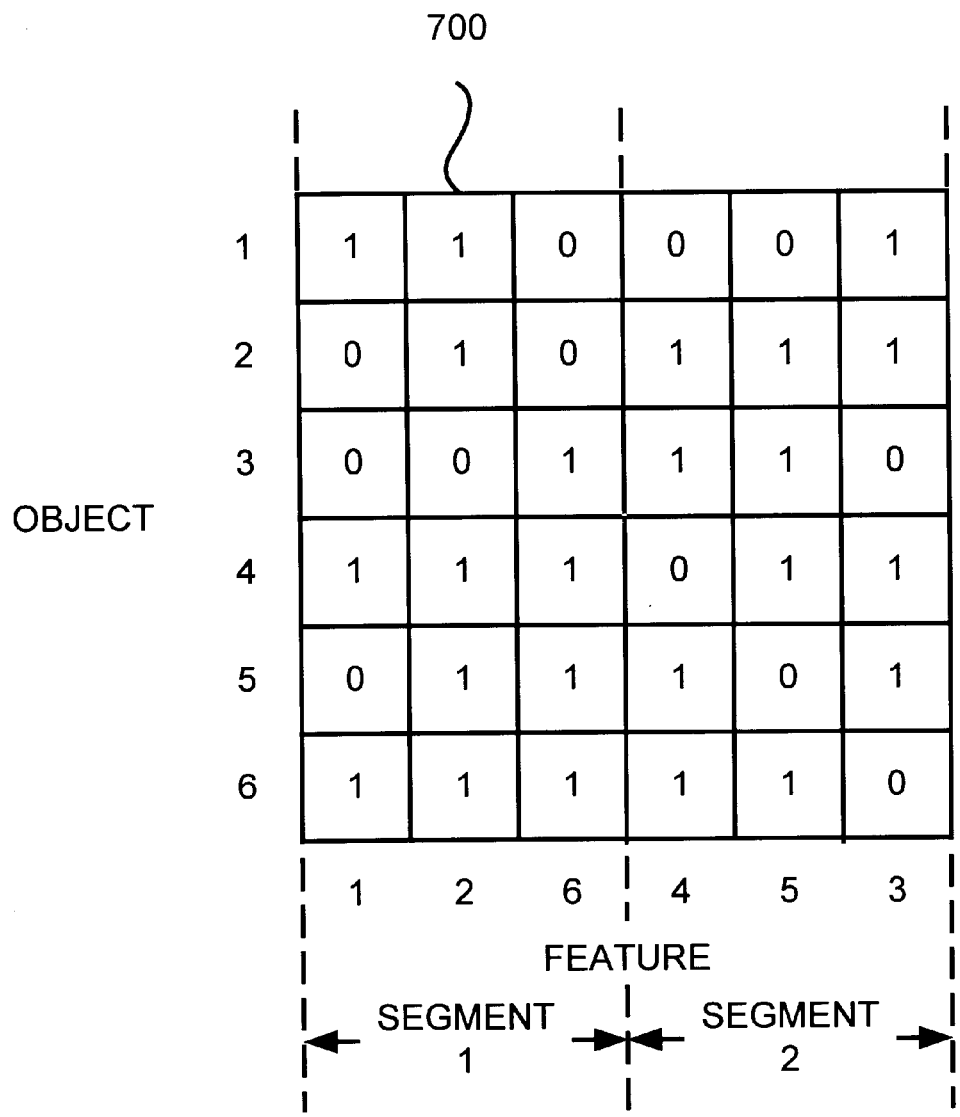
FIGS. 8A–8B depict 2 different outcomes of a "divide columns into segments" operation of the method of FIGS. 2A–2B, wherein the columns of the matrix of FIG. 7 are divided into 2 segments of equal length.
Figure 8B:
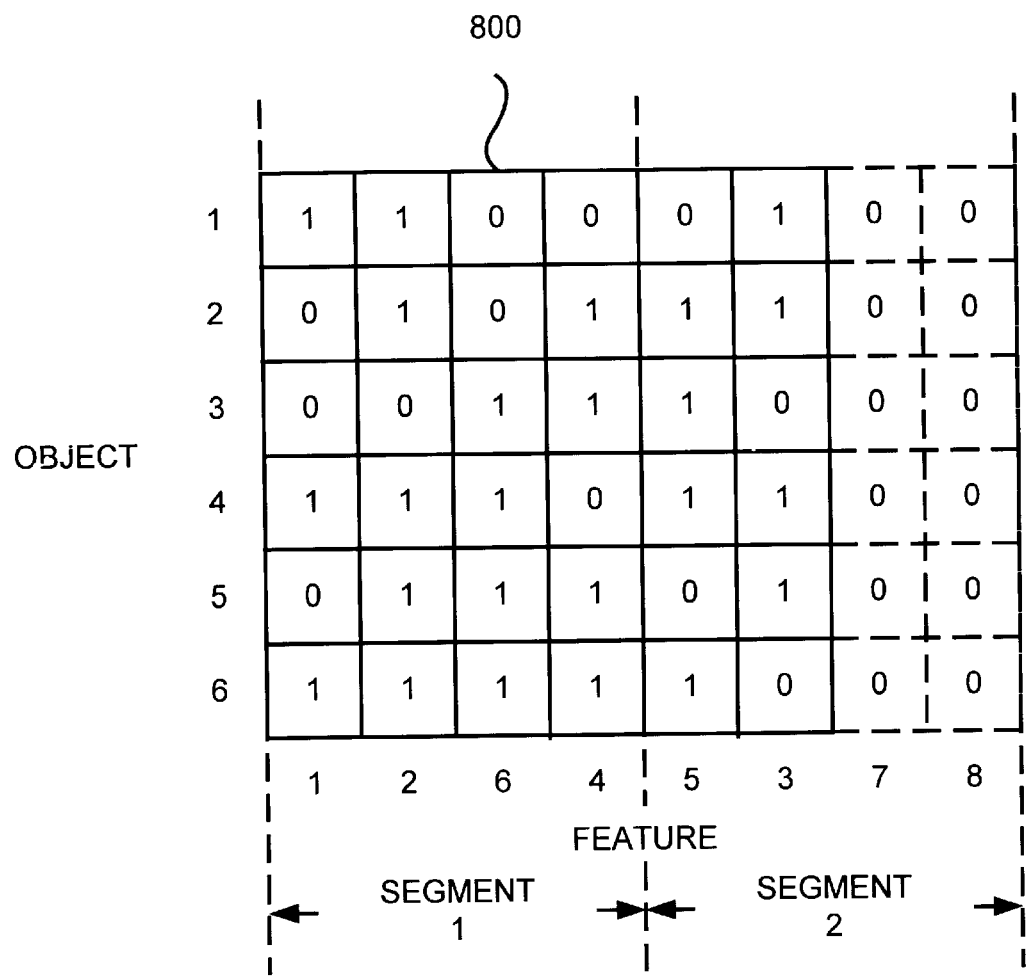

Turning back to FIG. 2, the next operation 212 of the method 200 includes dividing the columns of the matrix into multiple segments of equal length. FIGS. 8A–8B depict 2 different outcomes of dividing the columns of the matrix 700 of FIG. 7 into 2 segments of equal length. Turning to FIG. 8A, each of the 2 segments has a length of 3 column units, and encompasses 3 columns. It is noted that in FIG. 8A, a product of the number of segments (2) and the length of each segment in column units (3) is equal to the total number of columns in the matrix (6).

FIG. 8B will now be used to illustrate additional operations accomplished when a product of the number of segments and the length of each segment in column units exceeds the total number of columns in the matrix. Turning to FIG. 8B, a matrix 800 is shown, wherein the matrix 800 has been formed from the matrix 700 of FIG. 7. Each of 2 segments segmenting the matrix 800 has a length of 4 column units, and encompasses 4 columns. The product of the number of segments (2) and the length of each segment in column units (4) exceeds the total number of columns in the matrix (6). As a result, the matrix 700 of FIG. 7 has been extended to include ((2·4)−6)=2 additional columns (labeled 7 and 8 in FIG. 8B), forming the matrix 800. The values in the 2 added columns 7 and 8 are set to '0' as shown in FIG. 8B.

Turning back to FIG. 2, the next operation 214 of the method 200 includes replacing each set of matrix columns encompassed by a segment by a single column, and setting values at row-column intersections equal to rational fractions formed by dividing a total number of '1's in the portion of the corresponding row encompassed by a segment by the total number of '1's in the corresponding row.

Turning to FIG. 9A, a matrix 900 resulting from performing the operation 214 on the segmented matrix 700 of FIG. 8A is depicted. First and second columns of the matrix 900 correspond to segments 1 and 2, respectively, of the segmented matrix 700 of FIG. 8A. The first column in the matrix 900 represents, and corresponds to, columns 1, 2, and 6 of the segmented matrix 700, encompassed by segment 1. The second column of the matrix 900 represents, and corresponds to, columns 4, 5, and 3 of the segmented matrix 700, encompassed by segment 2.

In the segmented matrix 700 of FIG. 8A, row 1 includes the binary string "1 1 0 0 0 1." The totals number of '1's in row 1 is thus 3. The portion of row 1 encompassed by segment 1 (columns 1, 2, and 6) includes the binary string "1 1 0," including two '1's. Accordingly, the value at the intersection of row 1 and the first column of matrix 900 of FIG. 9A is set equal to the rational fraction formed by dividing the total number of '1's in the portion of row 1 encompassed by segment 1 (2) by the total number of '1's in row 1 (3).

The portion of row 1 encompassed by segment 2 (columns 4, 5, and 3) includes the binary string "0 0 1," including a single '1'. Thus the value at the intersection of row 1 and the second column of the matrix 900 of FIG. 9A is set equal to the rational fraction formed by dividing the total number of '1's in the portion of row 1 encompassed by segment 2 (1) by the total number of '1's in row 1 (3).

Turning to FIG. 9B, a matrix 902 resulting from performing the operation 214 on the segmented matrix 800 of FIG. 8B is depicted. First and second columns of the matrix 902 correspond to segments 1 and 2, respectively, of the segmented matrix 800 of FIG. 8B. The first column in the matrix 902 represents, and corresponds to, columns 1, 2, 6, and 4 of the segmented matrix 800, encompassed by segment 1. The second column of the matrix 902 represents, and corresponds to, columns 5, 3, 7, and 8 of the segmented matrix 800, encompassed by segment 2.

In the segmented matrix 800 of FIG. 8B, row 1 includes the binary string "1 1 0 0 0 1 0 0." The totals number of '1's in row 1 is thus 3. The portion of row 1 encompassed by segment 1 (columns 1, 2, 6, and 4) includes the binary string "1 1 0 0," including two '1's. Accordingly, the value at the intersection of row 1 and the first column of matrix 902 of FIG. 9B is set equal to the rational fraction formed by dividing the total number of '1's in the portion of row 1 encompassed by segment 1 (2) by the total number of '1's in row 1 (3).

The portion of row 1 encompassed by segment 2 (columns 5, 3, 7, and 8) includes the binary string "0 1 0 0," including a single '1'. Thus the value at the intersection of row 1 and the second column of the matrix 902 of FIG. 9B is set equal to the rational fraction formed by dividing the total number of '1's in the portion of row 1 encompassed by segment 2 (1) by the total number of '1's in row 1 (3).

Objects may be advantageously represented by strings of numerical values formed using the values in the corresponding columns of the matrix resulting from the operation 214. For example, referring to the matrix 900 of FIG. 9A, the string "$2/3$ $1/3$" may be used to represent object 1, and is indicative of the frequencies of features 1–6 in object 1. Similarly, the string "$1/4$ $3/4$" may be used to represent object 2, and is indicative of the frequencies of features 1–6 in object 2. Referring to the matrix 902 of FIG. 9B, the string "$2/3$ $1/3$" may be used to represent object 1, and the string "$2/4$ $2/4$" may be used to represent object 2.

For example, strings of numerical values derived using the above described method 200 of FIGS. 2A–2B may be used to represent corresponding objects containing organized data (i.e., information). Such organized data may be in the form of, for example, images, text, sounds, etc. Such objects may be members of an object collection. One example of an object collection is an image collection including images. The image collection may also include textual descriptions of the images. Another example of an object collection is a body of hypertext markup language (HTML) documents. As described above, HTML documents may include images, text, and/or sounds. The strings of numerical values may be advantageously employed in an information retrieval (IR) system to measure similarities between objects (e.g., during indexing), and between queries and stored data (e.g., during data retrieval).

It is noted that the values representing object 2 in the matrix 900 of FIG. 9A and the matrix 902 of FIG. 9B differ. This is due to the different lengths of the segments used to divide or segment the matrix 700 of FIG. 7. Experimentation has revealed that although the use of different segment lengths results in differences in the numerical strings used to represent the objects, these differences do not substantially impact information retrieval results.

When strings of numerical values derived using the above described method 200 of FIGS. 2A–2B were used to represent corresponding objects, and employed in an information retrieval (IR) system to measure similarities between objects (e.g., during indexing), and between queries and stored data (e.g., during data retrieval), the information retrieval (IR) system was highly effective when retrieving data deemed relevant to a human user's need for information. The positive results are believed due to the fact that the arranging operation, wherein the columns are arranged in sum total order, captures the frequencies of the selected features in the objects. It is also believed that the conversion of the matrix to a binary matrix, and/or the column reduction operation, serve to reduce any high degree of "granularity" resulting from the feature selection process.

Where an image collection includes both images and corresponding textual descriptions of the images, the method 200 of FIGS. 2A–2B may be advantageously used to analyze both image features and text features. One evaluation of three different information retrieval systems involved an image collection from the national aeronautics and space administration (NASA) mission STS-82, also known as the "Hubble Space Telescope Repair Mission." The image collection included 994 images, and corresponding textual descriptions of the images.

All three information retrieval systems accepted Boolean text token queries, and two of the three systems employed the method 200 of FIGS. 2A–2B. A first of the three systems returned search results based only on analysis of image features. A second of the three systems employed the method 200 of FIGS. 2A–2B, and returned search results based only on analysis of text token features. The third information retrieval system employed the method 200 of FIGS. 2A–2B, and returned search results based on analyses of both image features and text token features.

During the evaluation, "precisions" of the three image retrieval systems were judged by the manager of the NASA image archives at the Johnson space Center in Houston, Tex. System "precision" was defined as the ratio of the number of items retrieved by a system, and judged "relevant" by the qualified observer, to the total number of items retrieved by the system. Results of 25 different searches were used to produce a statistically significant measurement of precision for the systems.

During the rating process, only those conducting the evaluation knew which of the three information retrieval systems returned a particular image. The judge's responses were recorded, cross-referenced to the system of origin, and scored. The first information retrieval system that analyzed only image features achieved a precision score of 0.13. The second system that analyzed only text token features rated a precision score of 0.37. The third information retrieval system that analyzed both image features and text token features achieved a precision score of 0.43. The precision score of the information retrieval system that analyzed both image features and text token features was thus about 1.2 times that of the system that analyzed only text token features, and approximately 3.3 times that of the system that analyzed only image features.

Figure 10:
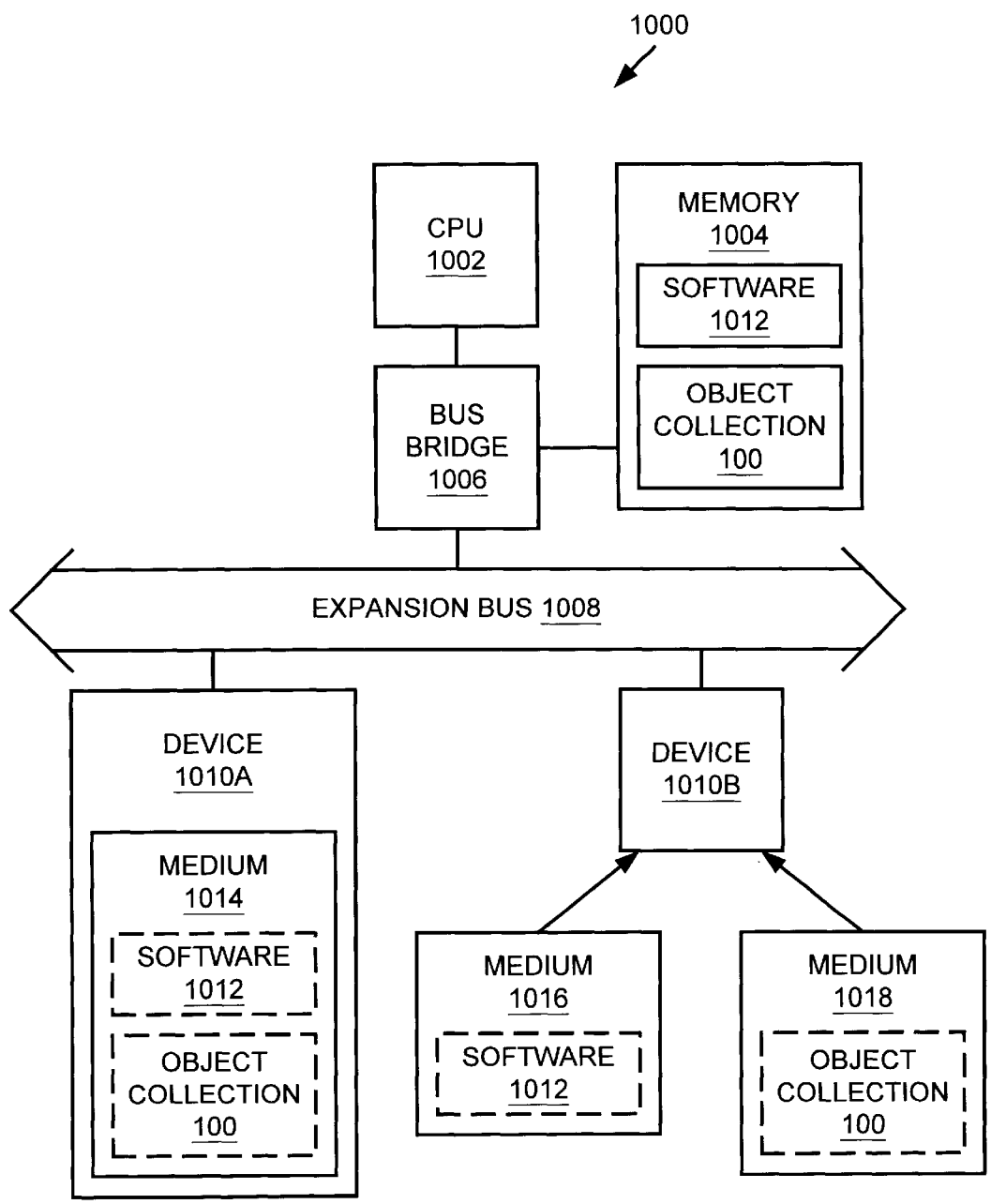
FIG. 10 is a diagram of one embodiment of a computer system that embodies the method of FIGS. 2A–2B, and can function as an information retrieval system.

FIG. 10 is a diagram of one embodiment of a computer system 1000 that can function as an information retrieval system. In the embodiment of FIG. 1, the computer system 1000 includes a central processing unit (CPU) 1002 and a memory 1004 coupled to a bus bridge 1006. The bus bridge 1006 is coupled to an expansion bus 1008 (e.g., a peripheral component interconnect (PCI) bus, an industry standard architecture (ISA) bus, etc.). The bus bridge 1006 translates signals between the CPU 1002, the memory 1004, and the expansion bus 1008.

During operation, the CPU 1002 obtains instructions and data from the memory 1004, and executes the instructions. In the embodiment of FIG. 1, the software 1012 and the object collection 100 of FIG. 1 reside in the memory 1004. The software 1012 includes instructions executable by the CPU 1002, and embodies the method 200 of FIGS. 2A–2B. When the computer system 1000 is functioning as an information retrieval system, the CPU 1002 accesses instructions from the software 1012, and data from the object collection 100.

In the embodiment of FIG. 10, two input/output devices 1010A and 1010B are coupled to the expansion bus 1008. The device 1010A includes a fixed medium 1014 for storing data (e.g., a fixed magnetic medium), wherein the data may include instructions. The device 1010A may be, for example, a hard disk drive. As indicated in FIG. 10, the software 1012 and the object collection 100 of FIG. 1 may be stored on the fixed medium 1014. When the computer system 1000 is functioning as an information retrieval system, the software 1012 and the object collection 100 may be copied from the fixed medium 1014 to the memory 1004.

The device 1010B is configured to receive data, including instructions, from media 1016 and/or 1018. The device 1010B may be, for example, a floppy disk drive, or a compact disk read only memory (CD-ROM) drive. In this situation, the media 1016 and/or the medium 1018 may be a portable medium (e.g., a carrier medium) such as a floppy disk or a CD-ROM disk. As indicated in FIG. 10, the software 1012 may be stored on the medium 1016, and the object collection 100 of FIG. 1 may be stored on the medium 1018. When the computer system 1000 is functioning as an information retrieval system, the software 1012 may be copied from the medium 1016 to the memory 1004, and the object collection 100 may be copied from the medium 1018 to the memory 1004.

Alternately, the device 1010B may be a modulator-demodulator (modem), or a network interface card (NIC). In this situation, the media 1016 and/or 1018 may be the same media. The medium 1016 and/or the medium 1018 may be, for example, a transmission medium, such as a communication line or cable (e.g., a telephone line, a coaxial cable, etc.). During operation, the device 1010B may receive a signal via the transmission medium, wherein the signal conveys data (including instructions) to the device 1010B. When the computer system 1000 is functioning as an information retrieval system, the software 1012 and/or the object collection 100 may be conveyed by the signal to the device 1010B, and copied to the memory 1004.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A computerized method, comprising:

arranging columns of a matrix in sum total order, wherein the matrix has at least one row and a plurality of intersecting columns, wherein each of the rows represents a different one of a plurality of objects, and wherein each of the columns represents a different one of a plurality of selected features, and wherein values reside at row-column intersections, and wherein a given value residing at an intersection of a given row and a given column corresponds to the given row and the given column, and represents a frequency of the selected feature represented by the given column in the object represented by the given row;

converting the matrix to a binary matrix comprising binary values;

dividing the columns of the matrix into a plurality of segments of equal length;

replacing matrix columns encompassed by each segment by a single column, and setting values at intersections of the rows and the single columns equal to numerical values indicative of ratios of a total number of the binary values in a portion of the corresponding row encompassed by a segment to a total number of the binary values in the corresponding row;

forming a plurality of text strings using the values at the intersections of the rows and the single columns;

associating each of the plurality of text strings a with the object represented by the row corresponding to the value used to form the text string;

receiving a query; and automatically selecting at least one of the plurality of objects based upon the query and the plurality of text strings.

2. The method as recited in claim 1, wherein the arranging comprises:

arranging columns of a matrix in sum total order, wherein the matrix has at least one row and a plurality of intersecting columns, wherein each of the rows represents a different object, and wherein each of the objects comprises image data, text data, or sound data, and wherein each of the columns represents a different one of a plurality of selected features, and wherein values reside at row-column intersections, and wherein a given value residing at an intersection of a given row and a given column corresponds to the given row and the given column, and represents the frequency of the selected feature represented by the given column in the object represented by the given row.

3. The method as recited in claim 1, wherein the arranging comprises:

arranging columns of a matrix in descending sum total order, wherein the matrix has at least one row and a plurality of intersecting columns, wherein each of the rows represents a different object, and wherein each of the columns represents a different one of a plurality of selected features, and wherein values reside at row-column intersections, and wherein a given value residing at an intersection of a given row and a given column corresponds to the given row and the given column, and represents the frequency of the selected feature represented by the given column in the object represented by the given row.

4. The method as recited in claim 1, wherein the converting comprises:
converting the matrix to a binary matrix comprising binary values of '0' and '1.'

5. The method as recited in claim 1, wherein the converting comprises:
converting the matrix to a binary matrix comprising binary values of '0' and '1' such that if a value representing the frequency of a given one of the features in a given one of the objects is greater than zero, the value is replaced by a '1', and if the value is equal to zero, the value is replaced by a '0'.

6. The method as recited in claim 5, wherein the replacing comprises:
replacing matrix columns encompassed by each segment by a single column, and setting values at intersections of the rows and the single columns equal to rational fractions formed by dividing a total number of '1' values in a portion of the corresponding row encompassed by a segment by a total number of '1' values in the corresponding row.

7. The method as recited in claim 5, wherein the replacing comprises:
replacing matrix columns encompassed by each segment by a single column, and performing the following for each of the segments;
replacing matrix columns encompassed by the segment by a single column, and setting values at intersections of the rows and the single column equal to rational fractions formed by dividing a total number of '1' values in a portion of the corresponding row encompassed by the segment by a total number of '1' values in the corresponding row.

8. The method of claim 1 wherein the features comprise at least one detectable pattern.

9. The method of claim 1, wherein the features comprise at least one of a shape, a corner, an edge, a symbol, a character, a text token) a word, a phrase a frequency variation, and an amplitude variation.

10. The method of claim 1, further comprising:
measuring similarities between the plurality of objects using the text strings.

11. A computer system, comprising:
a memory;
a central processing unit (CPU) coupled to the memory and configurable to obtain program instructions from the memory, and to execute the program instructions;
wherein during operation of the computer system, program instructions stored in the memory cause the CPU to:
arrange columns of a matrix in sum total order, wherein the matrix has at least one row and a plurality of intersecting columns, wherein each of the rows represents a different one of a plurality of objects, and wherein each of the columns represents a different one of a plurality of selected features, and wherein values reside at row-column intersections, and wherein a given value residing at an intersection of a given row and a given column corresponds to the given row and the given column, and represents the frequency of the selected feature represented by the given column in the object represented by the given row;
convert the matrix to a binary matrix comprising binary values '0' and '1';
divide the columns of the matrix into a plurality of segments of equal length;
replace matrix columns encompassed by each segment by a single column, and setting values at intersections of the rows and the single columns equal to numerical values indicative of ratios of a total number of one of the binary values in a portion of the corresponding row encompassed by a segment to a total number of the one of the binary values in the corresponding row;
form a plurality of text strings using the values at the intersections of the rows and the single columns; and
associate each of the plurality of text strings with the object represented by the row corresponding to the value used to form the text string.

12. A computer system, comprising:
a memory, wherein during operation of the computer system, program instructions are stored in the memory operable to implement:
arranging columns of a matrix in sum total order, wherein the matrix has at least one row and a plurality of intersecting columns, wherein each of the rows represents a different one of a plurality of objects, and wherein each of the columns represents a different one of a plurality of selected features, and wherein values reside at row-column intersections, and wherein a given value residing at an intersection of a given row and a given column corresponds to the given row and the given column, and represents the frequency of the selected feature represented by the given column in the object represented by the given row;
converting the matrix to a binary matrix comprising binary values;
dividing the columns of the matrix into a plurality of segments of equal length;
replacing matrix columns encompassed by each segment by a single column, and setting values at intersections of the rows and the single columns equal to numerical values indicative of ratios of a total number of one of the binary values in a portion of the corresponding row encompassed by a segment to a total number of the one of the binary values in the corresponding row;
forming a plurality of text strings using the values at the intersections of the rows and the single columns;
associating each of the plurality of text strings with the object represented by the row corresponding to the value used to form the text string;
receiving a query; and
selecting at least one of the plurality of objects based upon the query and the plurality of text strings; and
a central processing unit (CPU) coupled to the memory and configurable to obtain the program instructions from the memory, and to execute the program instructions.

13. A computerized method, comprising:
determining a frequency of each of a plurality of selected features in each of at least one object;
using the frequency information to construct a two-dimensional matrix having at least one row and a plurality of intersecting columns, wherein each of the rows represents a different one of the at least one objects, and wherein each of the columns represents a different one of the selected features, and wherein values reside at row-column intersections, and wherein a given value residing at an intersection of a given row and a given column corresponds to the given row and the given column, and represents the frequency of the selected feature represented by the given column in to object represented by the given row;

summing the values in each of the columns of the matrix to produce a sum total for each of the columns;

arranging the columns of the matrix in sum total order;

converting the matrix to a binary matrix comprising values of '0' and '1';

dividing the columns of the matrix into a plurality of segments of equal length; and replacing matrix columns encompassed by each segment by a single column, and setting values at intersections of the rows and the single columns equal to rational fractions formed by dividing a total number of '1' values in a portion of the corresponding row encompassed by a segment by a total number of '1' values in the corresponding row;

forming a plurality of text strings using the values at the intersections of the rows and the single columns;

associating each of the plurality of text strings with the object represented by the row corresponding to the value used to form the text string;

receiving a query; and selecting at least one of the plurality of objects based upon the query and the plurality of text strings.

14. The method as recited in claim 13, wherein the determining comprises:

determining a frequency of each of a plurality of selected features in each of at least one object, wherein each of the objects comprises image data, text data, or sound data.

15. The method as recited in claim 13, wherein the determining comprises:

determining a frequency of each of a plurality of selected features in each of at least one object of an object collection.

16. The method as recited in claim 13, wherein the determining comprises:

determining a frequency of each of a plurality of selected features in each of at least one object of an object collection, wherein the selected features are selected from features present in the at least one object of the object collection.

17. The method as recited in claim 13, wherein the arranging comprises:

arranging columns of a matrix in descending stun total order, wherein the matrix has at least one row and a plurality of intersecting columns, wherein each of the rows represents a different object, and wherein each of the columns represents a different one of a plurality of selected features, and wherein values reside at row-column intersections, and wherein a given value residing at an intersection of a given row and a given column corresponds to the given row and the given column, and represents the frequency of the selected feature represented by the given column in the object represented by the given row.

18. The method as recited in claim 13, wherein the converting comprises:

converting the matrix to a binary matrix comprising binary values of '0' and '1' such that if a value representing the frequency of a given one of the features in a given one of the objects is greater than zero, the value is replaced by a '1', and if the value is equal to zero, the value is replaced by a '0'.

19. A carrier medium comprising program instructions, wherein the program instructions are operable to implement:

arranging columns of a matrix in sum total order, wherein the matrix has at least one row and a plurality of intersecting columns, wherein each of the rows represents a different one of a plurality of objects, and wherein each of the columns represents a different one of a plurality of selected features, and wherein values reside at row-column intersections, and wherein a given value residing at an intersection of a given row and a given column corresponds ta the given row and the given column, and represents the frequency of the selected feature represented by the given column in the object represented by the given row;

converting the matrix to a binary matrix comprising binary values;

dividing the columns of the matrix into a plurality of segments of equal length; and replacing matrix columns encompassed by each segment by a single column, and setting values at intersections of the rows and the single columns equal to numerical values indicative of ratios of a total number of one of the binary values in a portion of the corresponding row encompassed by a segment to a total number of the one of the binary values in the corresponding row;

forming a plurality of text strings using the values at the intersections of the rows and the single columns; and associating each of the plurality of text strings with the object represented by the row corresponding to the value used to form the text string.

20. The carrier medium as recited in claim 19, wherein the carrier medium is a computer-readable storage medium.

21. The cater medium as recited in claim 20, wherein the computer-readable storage medium is a floppy disk or a compact disk read only memory (CD-ROM) disk.

* * * * *